US005933164A

United States Patent [19]
Sato et al.

[11] Patent Number: 5,933,164
[45] Date of Patent: Aug. 3, 1999

[54] INK-JET RECORDING METHOD

[75] Inventors: Shinichi Sato, Kawasaki; Shinichi Tochihara, Hadano, both of Japan

[73] Assignee: Canon Kabushiki Kaisha, Tokyo, Japan

[21] Appl. No.: 08/815,411

[22] Filed: Mar. 11, 1997

Related U.S. Application Data

[63] Continuation of application No. 08/220,508, Mar. 31, 1994, abandoned.

[30] Foreign Application Priority Data

Apr. 5, 1993 [JP] Japan .................................... 5-100081

[51] Int. Cl.[6] ................................ B41J 2/21; B41J 2/17; G01D 11/00

[52] U.S. Cl. ................................ 347/43; 347/98; 347/100

[58] Field of Search ................................ 347/43, 40, 100, 347/105, 15, 98

[56] References Cited

U.S. PATENT DOCUMENTS

| | | | |
|---|---|---|---|
| 4,290,072 | 9/1981 | Mansukhani | 347/98 |
| 4,630,076 | 12/1986 | Yoshimura | 347/15 |
| 4,702,742 | 10/1987 | Iwata et al. | 347/100 |
| 4,923,515 | 5/1990 | Koike et al. | 347/100 |
| 4,943,816 | 7/1990 | Sporer | 347/105 |
| 4,957,553 | 9/1990 | Koike et al. | 347/100 |
| 5,078,790 | 1/1992 | Tochihara et al. | 106/31.43 |
| 5,080,716 | 1/1992 | Aoki et al. | 106/31.43 |
| 5,099,255 | 3/1992 | Koike et al. | 347/100 |
| 5,101,217 | 3/1992 | Iwata et al. | 347/100 |
| 5,125,969 | 6/1992 | Nishiwaki et al. | 106/31.52 |
| 5,131,949 | 7/1992 | Tochihara et al. | 106/31.43 |
| 5,132,700 | 7/1992 | Tochihara et al. | 347/100 |
| 5,135,571 | 8/1992 | Shirota et al. | 106/31.51 |
| 5,137,570 | 8/1992 | Nishiwaki et al. | 347/100 |
| 5,182,571 | 1/1993 | Creagh et al. | 347/98 |
| 5,213,613 | 5/1993 | Nagashima et al. | 106/31.43 |
| 5,256,194 | 10/1993 | Nishiwaki et al. | 106/31.52 |
| 5,258,066 | 11/1993 | Kobayashi et al. | 106/31.58 |
| 5,296,022 | 3/1994 | Kobayashi et al. | 347/87 |
| 5,428,377 | 6/1995 | Stoffel et al. | 347/15 |
| 5,635,969 | 6/1997 | Allen | 347/96 |

FOREIGN PATENT DOCUMENTS

| | | |
|---|---|---|
| 55-29546 | 3/1980 | Japan . |
| 56-57862 | 5/1981 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

Disclosed herein is an ink-jet recording method in which at least four inks composed of three color inks of cyan, magenta and yellow colors and a colorless ink containing a penetrant are used to record a color image, wherein the recording is conducted so as to overlap the penetrant-containing colorless ink and the color inks each other in a region along boundary lines to be defined by differences in hue of an image to be formed with the color inks, and to form an image with the color inks alone in other regions than the above region.

10 Claims, 6 Drawing Sheets

INK-JET RECORDING METHOD

This application is a continuation of application Ser. No. 08/220,508 filed Mar. 31, 1994, now abandoned.

BACKGROUND OF THE INVENTION

1. Field of the Invention

The present invention relates to an ink-jet recording method by which high-quality color images can be formed at high speed on so-called plain paper such as paper for copying and bond paper.

2. Related Background Art

In recent years, the developments of color displays in personal computers from desktop types to laptop and note types have been advanced. Besides, application softwear for making good use of color's power of expression has been published. Therefore, color recording by printers is the most promising field.

Among various recording processes used in these printers, an ink-jet recording process is a process in which droplets of an ink are formed by any of various ink-ejection systems, and they are applied to a recording material such as paper, converted paper, plastic film or a cloth to conduct recording. The process has advantages that a recording apparatus making use of such a process is silent because a recording head makes no contact with a recording material, printing can be conducted at high speed, and color recording can be achieved with ease.

In the ink-jet recording process, inks used have heretofore been required to have the following properties:

(1) causing no feathering in printed areas on a recording material;

(2) being high in storage stability; and (3) being high in safety upon their use.

In an ink-jet recording process for conducting color recording, inks are required in addition to the above properties to have the following properties:

(4) undergoing no color mixing (bleeding) of inks of different colors, which is caused due to unfixing of droplets of the inks when applying them to adjoining portions on a recording material to conduct printing; and (5) causing no color irregularity, in particular, in color solid-printed areas of the resultant print.

However, the inks routinely used have involved a problem that when they are used as inks for color ink-jet recording as they are, bleeding occurs to a great extent, resulting in a failure to form an image. For this reason, exclusive recording materials called coated paper, which are good in ink-absorbing property, have been used to suppress the occurrence of bleeding.

In the case where printing has been conducted on so-called plain paper such as paper for copying and bond paper, there has been a problem that since the printing is conducted while waiting for the ink droplets in the printed area to fix for suppressing the occurrence of bleeding, printing speed becomes very slow. As described above, the inks routinely used have scarcely had selectivity for paper to be used under the circumstances.

In order to improve the resistance to feathering and the fixing property of ink droplets in the printed area on the plain paper as the above-described problems, it has been attempted to use inks the pH of which has been adjusted to strong alkali to conduct recording (for example, Japanese Patent Application Laid-Open No. 56-57862) and to use inks added with a great amount of a surfactant to conduct recording (for example, Japanese Patent Application Laid-Open No. 55-29546).

Even if these inks are used to conduct printing, however, resistance to bleeding is not always sufficiently improved. In the case where bleeding occurs to a relatively small extent, there has also been a problem that the feathering in the printed area as to the item (1) of the above properties required of the inks markedly occurs, resulting in deterioration in image quality. There has not been yet developed under the circumstances any color ink-jet recording ink which can provide high-quality images at high speed even when recording on plain paper.

SUMMARY OF THE INVENTION

It is thus an object of the present invention to provide an ink-jet recording method which can solve the above problems involved in the prior art, permits speedy printing even on plain paper and can provide high-quality images free of any bleeding.

The above object can be achieved by the present invention described below.

According to the present invention, there is thus provided an ink-jet recording method in which at least four inks composed of three color inks of cyan, magenta and yellow colors and a colorless ink containing a penetrant are used to record a color image, wherein the recording is conducted so as to overlap the penetrant-containing colorless ink and at least one of the color inks each other in a region along boundary lines to be defined by differences in hue of an image to be formed with the color inks, and to form an image with the color inks alone in other regions than the above region.

According to the present invention, there is also provided an ink-jet recording process comprising ejecting droplets of an ink from an orifice in accordance with a recording signal to conduct recording on a recording material, wherein the process is carried out in accordance with the recording method described above.

DESCRIPTION OF THE PREFERRED EMBODIMENTS

The present inventors have carried out an extensive investigation with a view toward solving the above-described problems involved in the prior art. As a result, it has been found that when recording is conducted so as to overlap a colorless ink containing a penetrant and at least one of three inks of cyan, magenta and yellow colors (hereinafter referred to as color inks) each other in a region containing boundary lines to be defined by adjacent droplets of different colors, in which bleeding will occur, the occurrence of bleeding can be prevented, thus leading to the completion of the present invention. More specifically, when the penetrant-containing colorless ink is laid to overlap an area in an image at which bleeding may occur and color inks of different colors adjoin, the interfacial tension between the color inks and a recording material can be lowered, so that the affinity of the color inks for the recording material is enhanced. As a result, the color inks can be fixed at high speed, and the occurrence of bleeding can hence be prevented.

The present invention will hereinafter be described in more detail by the preferred embodiments.

The penetrant contained in the colorless ink useful in the practice of the present invention comprises at least one surfactant selected from the group consisting of nonionic surfactant, ionic surfactants.

No particular limitation is imposed on the penetrant so far as it comprises at least one of the above-mentioned surfactants. However, desirable examples thereof include nonionic surfactants such as ethylene oxide adducts of alkyl phenyl ethers, polyethylene oxide-polypropylene oxide copolymers and ethylene oxide adducts of acetylene glycol; and anionic surfactants of the sulfate or sulfonate type. The amount of the penetrant to be added may preferably be within a range of from 0.5 to 20% by weight based on the total weight of the ink.

The term "colorless ink" as used herein means an ink which does not affect the color tone of a color ink when it is shot on the color ink. The ink may be a light-colored ink.

In the present invention, the term "region along boundary lines to be defined by differences in hue in an image to be formed", on which the colorless ink will be shot, means a region in an image, which contains such portions that droplets of two or more color inks adjoin each other to form boundaries. Such a region will be described specifically with reference to FIG. 1.

Figure 1:
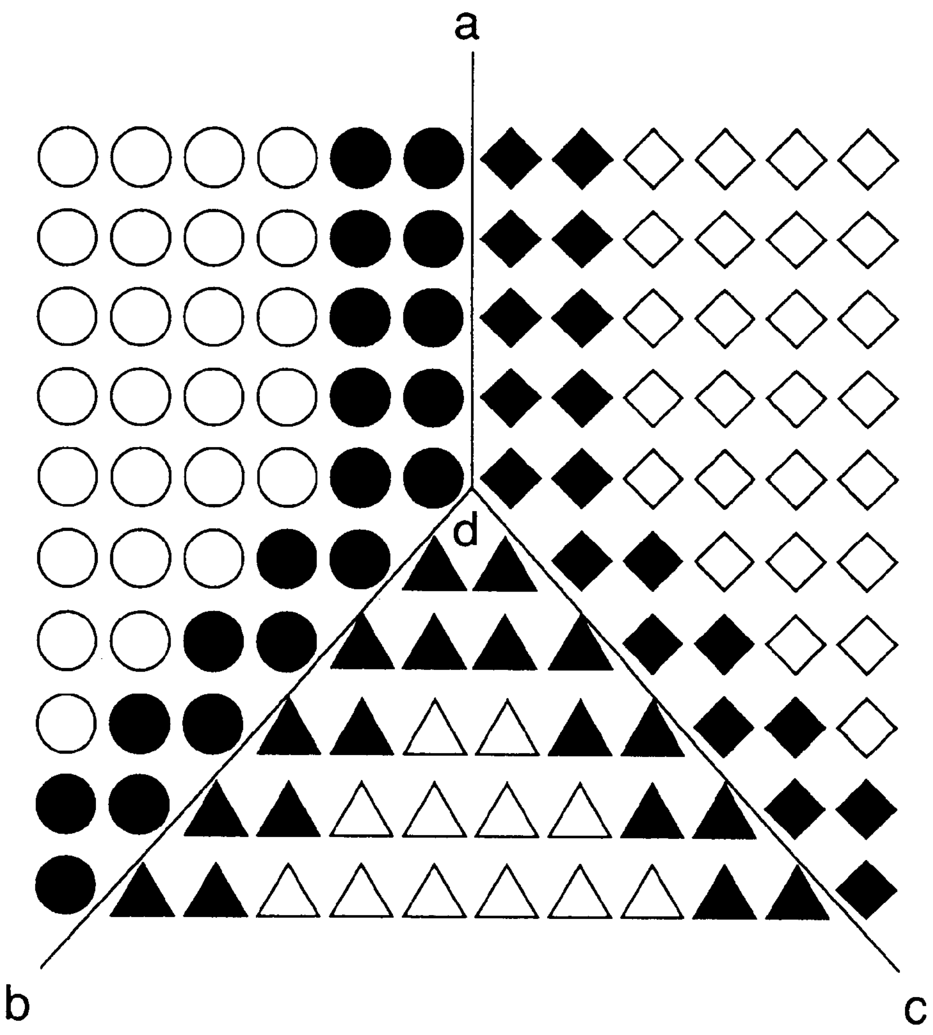
FIG. 1 illustrates an exemplary recorded image to explain a region along boundary lines defined by differences in hue in the image.

FIG. 1 is an enlarged conceptual illustration of a square image divided by 3 colors of ○, ◇ and Δ. In the case of this image, the region along the boundary lines defined by differences in hue in the image is the image itself formed of 12×10 dots.

Accordingly, if the penetrant-containing colorless ink and the color inks are laid to overlap each other in the region of 12×10 dots to conduct recording, the affinity of the color inks for the recording material can be enhanced, resulting in an image free of any bleeding.

If color recording is conducted in accordance with the recording method as described above, the occurrence of bleeding can be effectively suppressed not only in such a relatively simple image as illustrated in FIG. 1, but also in an image, such as a natural picture, in which different colors are complicatedly arranged.

Incidentally, the use of this penetrant-containing colorless ink generally has a tendency for the color tone of a color image formed to slightly change compared with the case where no colorless ink is used.

In the present invention, it is therefore more desirable for an image in which boundaries between colors are defined clearly, as illustrated in FIG. 1, that the recording method in which the penetrant-containing colorless ink is laid to overlap the color inks be used in only a part of the region along the boundary lines to be defined by differences in hue in the image. More specifically, in the case of such an image, if the penetrant-containing colorless ink is applied to only the color boundary portions, at which bleeding occurs, the consumption of the colorless ink can be saved, and besides, the dot shape of ink droplets forming the image can be made better.

In this case, it is preferable that the color boundary portions (a part of the region along the boundary lines to be defined by differences in hue in the image), to which the colorless ink should be applied, be limited within a range in which the slight change in color tone of the image caused by the application of the penetrant-containing colorless ink becomes inconspicuous.

For example, in FIG. 1, the color boundary lines defined by differences in hue in the image are lines ad, bd and cd in the drawing, while the part of the region along the color boundary lines is only some of the respective namely, which are shown in black. Therefore, it is only necessary to lay the colorless ink to overlap on the dot portions shown in black to conduct recording.

In the case of the exemplary image illustrated in FIG. 1, the color boundary portions (a part of the region along the boundary lines to be defined by differences in hue in the image), to which the colorless ink should be applied, may preferably be each a region not exceeding 0.3 mm from the boundary line defined by two or more color inks adjoining each other in directions of the individual colors. If the colorless ink is applied to a region exceeding 0.3 mm from the boundary line, a slight difference in color tone arises between the portion applied with the colorless ink and the portion not applied with the colorless ink. It is hence not preferable to apply the colorless ink to the region exceeding 0.3 mm.

No particular limitation is imposed on a liquid medium suitable for use in forming the four inks of the cyan, magenta and yellow inks and the colorless ink useful in the practice of this invention so far as it is a water-soluble organic solvent.

Examples of the water-soluble organic solvent include polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, hexylene glycol, diethylene glycol and thiodiglycol; 1,2,6-hexanetriol; glycerol; lower alkyl ethers of polyhydric alcohols, such as ethylene glycol methyl ether, diethylene glycol methyl (or ethyl) ether and triethylene glycol monomethyl (or monoethyl) ether; alcohols such as methyl alcohol, ethyl alcohol, n-propyl alcohol, isopropyl alcohol, n-butyl alcohol, sec-butyl alcohol, tert-butyl alcohol, isobutyl alcohol, benzyl alcohol and cyclohexanol; amides such as dimethylformamide and dimethylacetamide; ketones and ketone alcohols such as acetone and diacetone alcohol; ethers such as tetrahydrofuran and dioxane; nitrogen-containing heterocyclic ketones such as N-methyl-2-pyrrolidone, 2-pyrrolidone and 1,3-dimethyl-2-imidazolidinone; and the like.

Among these water-soluble organic solvents, ethylene glycol, triethylene glycol, hexylene glycol, diethylene glycol, glycerol, ethyl alcohol, isopropyl alcohol and cyclohexanol are preferred. In general, the content of the water-soluble organic solvent is preferably within a range of from 1 to 15% by weight based on the total weight of the ink.

Examples of dyes used as coloring materials for the three color inks of cyan, magenta and yellow colors used in the present invention include direct dyes, acid dyes, basic dyes, reactive dyes, disperse dyes, vat dyes and the like. Although the content of these dyes is determined depending on the kinds of liquid medium components, properties required of the resulting inks and the like, it is generally within a range of from 0.5 to 15% by weight, preferably from 1 to 7% by weight based on the total weight of the ink.

The principal components making up the four inks of the cyan, magenta and yellow inks and the colorless ink used in the present invention are as described above. Besides, anti-clogging agents such as urea and derivatives thereof; viscosity modifiers such as polyvinyl alcohol, cellulose and derivatives thereof, and water-soluble resins; pH adjustors such as diethanolamine, triethanolamine and buffers; mildewproofing agents; and the like may be optionally added within limits not impeding the object of the present invention.

In the case where inks intended for use in an ink-jet recording process of a type that the inks are charged are prepared, it is preferable to add a specific resistance adjustor such as an inorganic salt such as lithium chloride, ammonium chloride or sodium chloride.

It is also preferable to adjust the surface tension of the three inks of the cyan, magenta and yellow colors used in the present invention within a range of from 0.03 to 0.07 N/m so as to improve the resistance to ink feathering and the drying property of ink droplets in a printed area when conducting recording on plain paper.

The color inks used in the present invention may suitably be used, in particular, in an ink-jet recording system of a type that recording is conducted by ejecting droplets of an ink by the action of thermal energy. It however goes without saying that the inks may also be used for other ink-jet recording systems and general-purpose writing utensils.

As preferred apparatus for conducting recording by using the inks according to the present invention, may be mentioned an apparatus in which thermal energy corresponding to recording signals is applied to an ink within a recording head, and ink droplets are generated by the thermal energy.

Figure 2:
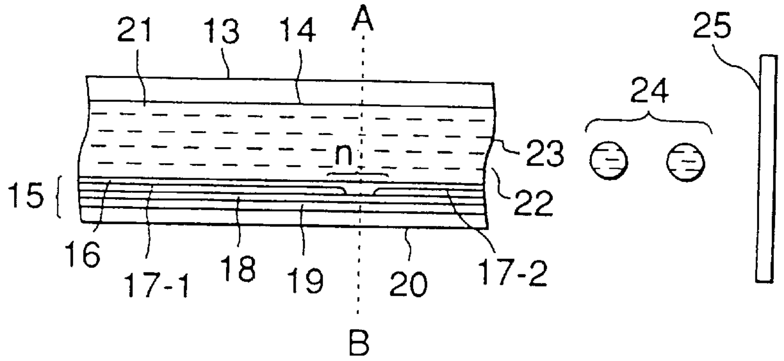
FIG. 2 PRIOR ART
FIG. 2 is a longitudinal cross-sectional view of a head of an ink-jet recording apparatus.
Figure 3:
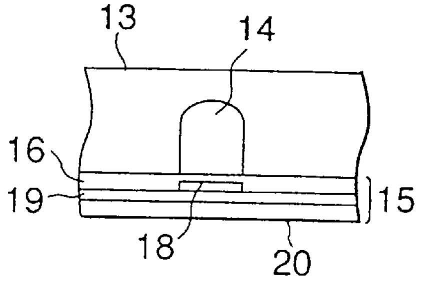
FIG. 3 PRIOR ART
FIG. 3 is a transverse cross-sectional view of the head of the ink-jet recording apparatus.
Figure 4:
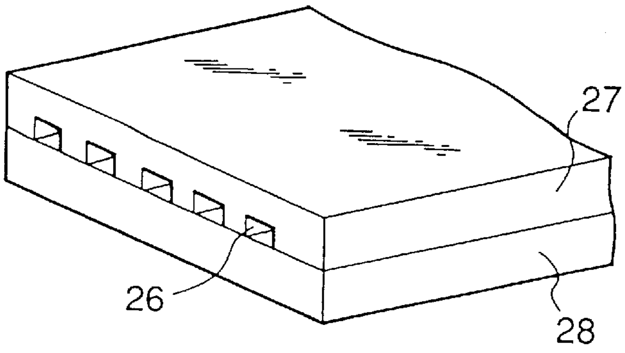
FIG. 4 PRIOR ART
FIG. 4 is a perspective view of the appearance of another head of the ink-jet recording apparatus.

Examples of the construction of a head, which is a main component of such an apparatus, are illustrated in FIGS. 2, 3 and 4.

A head 13 is formed by bonding a glass, ceramic, plastic plate or the like having a groove through which an ink is passed, to a heating head 15, which is used for thermal recording and has a heating resistor (the drawing shows a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

The ink 21 comes up to an ejection orifice (minute opening) 22 and forms a meniscus 23 owing to a pressure.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24. FIG. 4 illustrates an appearance of a multi-head composed of an array of a number of heads as shown in FIG. 2. The multi-head is formed by closely bonding a glass plate 27 having a number of channels to a heating head 28 similar to the head as illustrated in FIG. 2. Incidentally, FIG. 2 is a cross-sectional view of the head 13 taken along the flow path of the ink, and FIG. 3 is a cross-sectional view taken along line A–B in FIG. 2.

Figure 5:
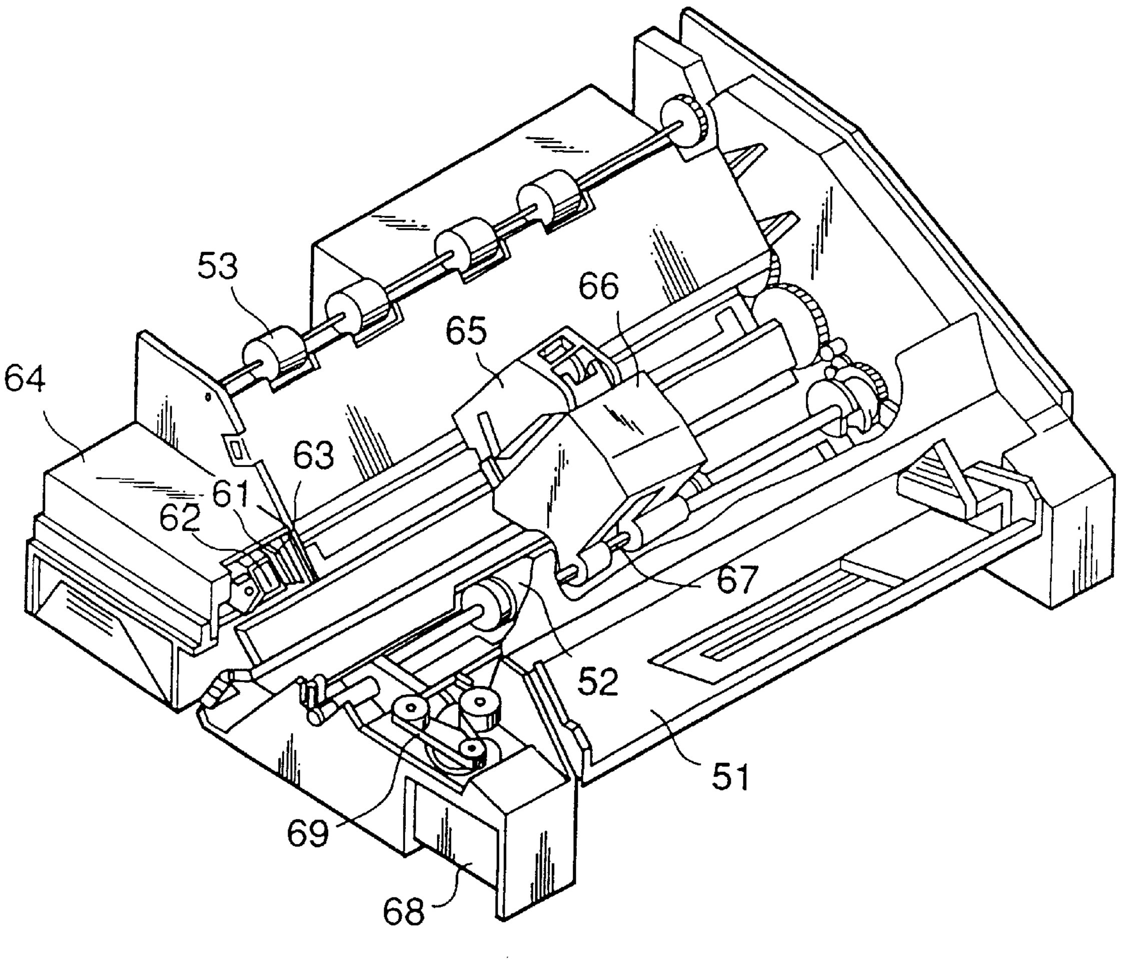
FIG. 5 PRIOR ART
FIG. 5 is a perspective view of an illustrative ink-jet recording apparatus.

FIG. 5 illustrates an example of an ink-jet recording apparatus in which such a head has been incorporated.

In FIG. 5, reference numeral 61 designates a blade serving as a wiping member, one end of which is a stationary end held by a blade-holding member to form a cantilever. The blade 61 is provided at the position adjacent to the region in which a recording head makes a record, and in this embodiment, is held in such a form that it protrudes to the course through which the recording head is moved.

Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved.

The above-described blade 61, cap 62 and absorbing member 63 constitute an ejection-recovery portion 64, where the blade 61 and absorbing member 63 remove off water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 6:
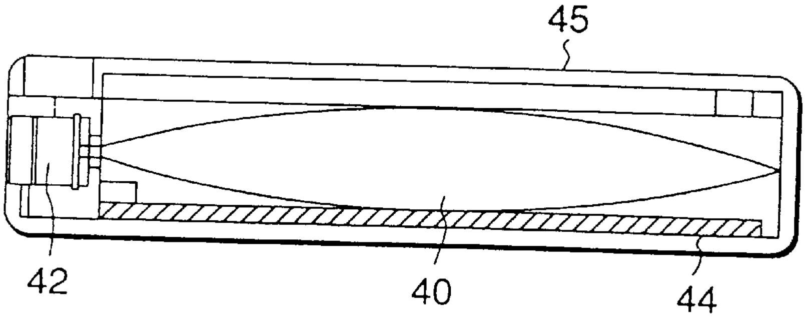
FIG. 6 PRIOR ART
FIG. 6 is a longitudinal cross-sectional view of an ink cartridge.

FIG. 6 illustrates an exemplary ink cartridge, donated as 45, in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

The ink-jet recording apparatus used in the present invention may not be limited to the apparatus as described above in which the head and the ink cartridge are separately provided. Therefore, a device in which these members are integrally formed as shown in FIG. 7 can also be preferably used.

Figure 7:
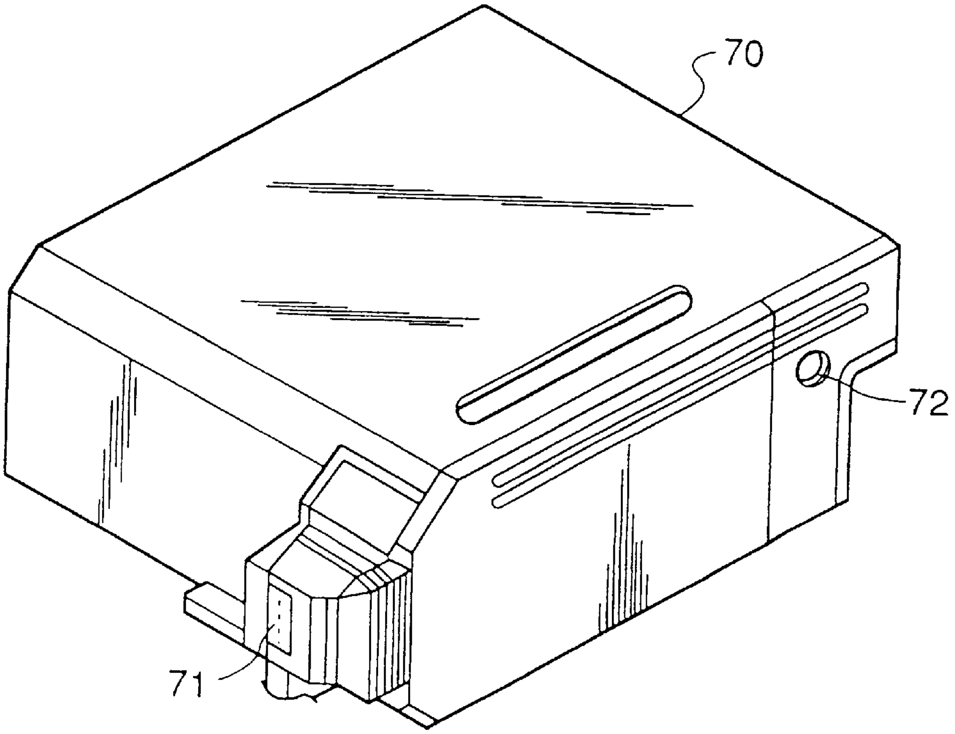
FIG. 7 PRIOR ART
FIG. 7 is a perspective view of a recording unit.

In FIG. 7, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. Reference numeral 72 indicates an air passage for communicating the interior of the recording unit 70 with the atmosphere. This recording unit 70 can be used in place of the recording head 65 shown in FIG. 5, and is detachably installed on the carriage 66.

Figure 8:
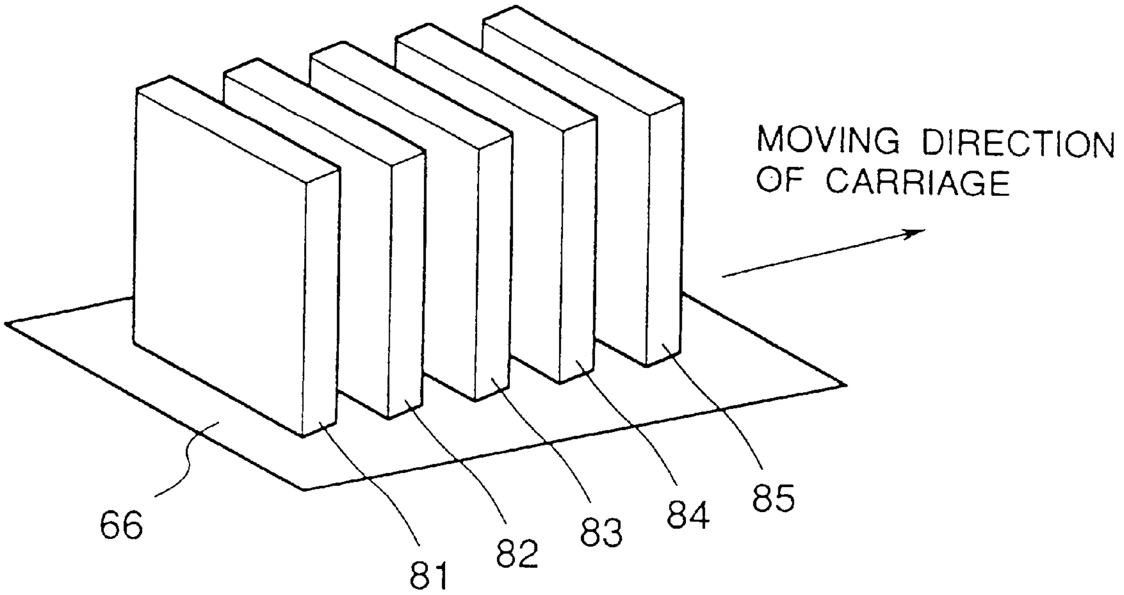
FIG. 8 PRIOR ART
FIG. 8 is a perspective view illustrating a recording part used in examples of the present invention, in which a plurality of recording heads is arranged.

In the case where the recording method according to the present invention is carried out by using, for example, five inks of black, cyan, magenta, yellow inks and a colorless ink as recording inks, a recording apparatus in which five recording heads, each of which has been illustrated in FIG. 4, are arranged on a carriage 66, is used. An example thereof is illustrated in FIG. 8. Reference numerals 81, 82, 83 and 84 indicate recording heads for ejecting out four inks of black, cyan, magenta and yellow colors, respectively. Reference numeral 85 designates a head for ejecting out the colorless ink. These heads are arranged in the above-described recording apparatus and serve to eject out the recording inks of the respective colors according to recording signals.

Figure 9:
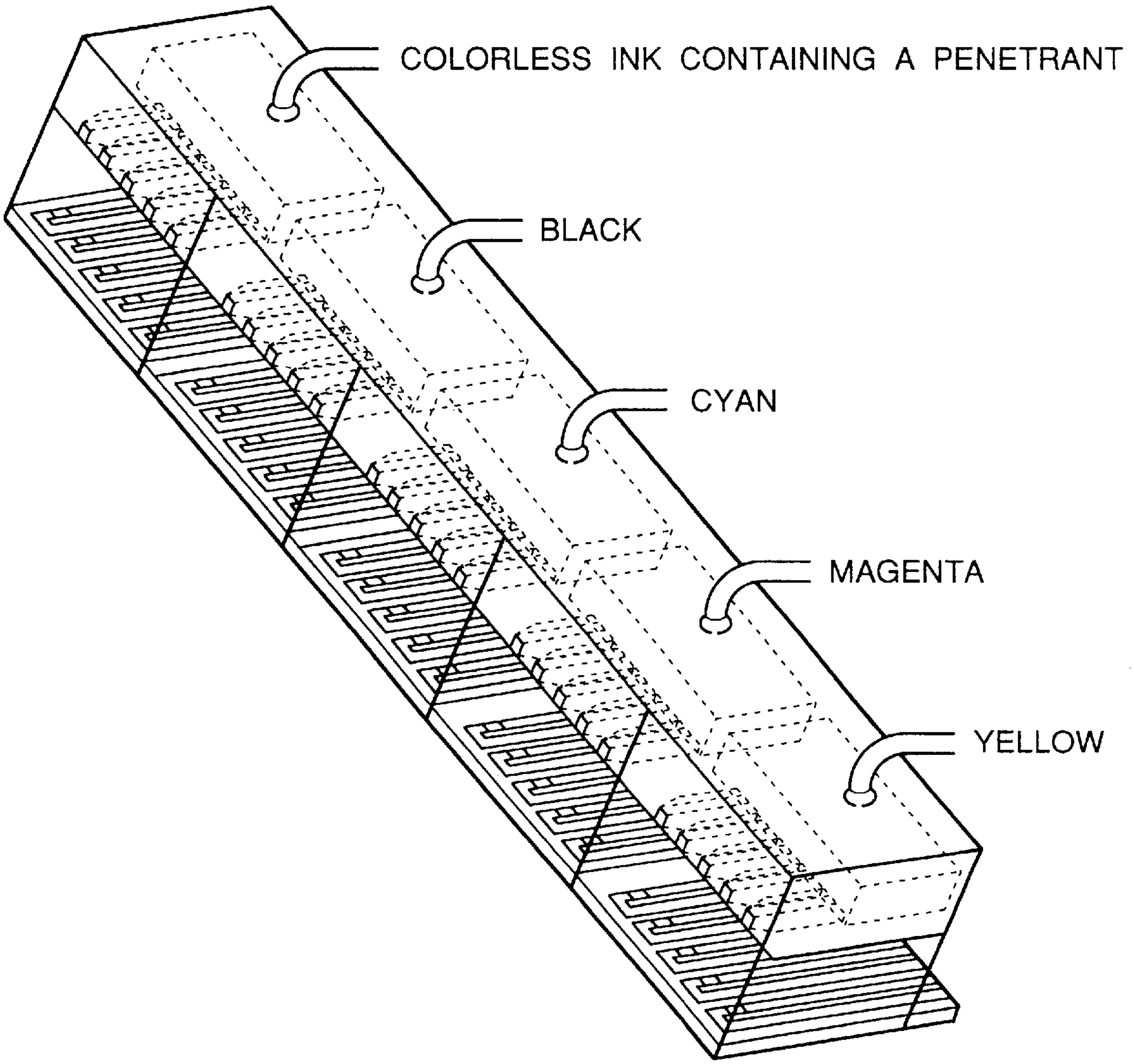
FIG. 9 is a perspective view of another recording head used in the present invention.

FIG. 8 shows the case where the five recording heads have been used. However, the present invention is not limited thereto. As shown in FIG. 9, the five inks of the black, cyan, magenta, yellow inks and the colorless ink may be ejected by one recording head.

Incidentally, in the recording apparatus used in the present invention, the ink-jet recording apparatus in which heat energy is applied to an ink to eject out droplets of the ink has been described by way of example. However, the present invention can also be used in other ink-jet recording apparatus such as a piezo-system making use of a piezoelectric element.

In the recording unit, if an ink contained therein has been consumed, an ink according to the present invention can be filled again in the unit to reuse it.

The present invention will hereinafter be described more specifically by the following examples and comparative example. Incidentally, all designations of "part" or "parts" and "%" as will be used in the following examples mean part or parts by weight and % by weight unless expressly noted.

The kinds and amounts of dyes contained in four inks of black, cyan, magenta and yellow colors used in the examples and comparative example are as follows:

| | | |
|---|---|---|
| Black ink: | C.I. Food Black 2 | 1.75 parts |
| | Dye A described below | 1.05 parts |
| | Dye B described below | 0.7 part |
| Yellow ink: | C.I. Direct Yellow 86 | 2 parts |
| Cyan ink: | C.I. Direct Blue 199 | 3 parts |
| Magenta ink: | Dye C described below | 3 parts. |

Dye A:

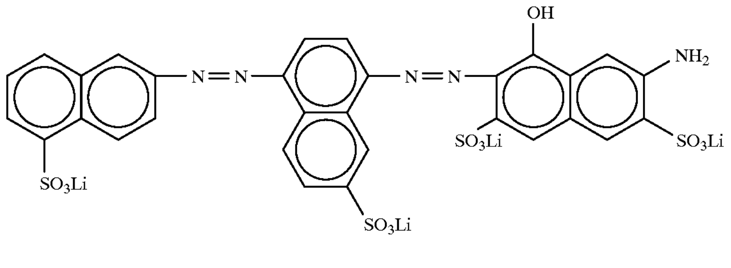

Dye B:

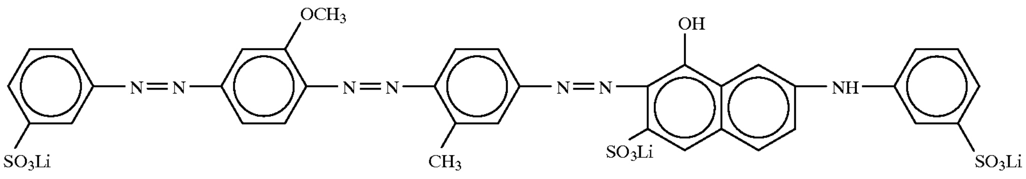

-continued

Dye C:

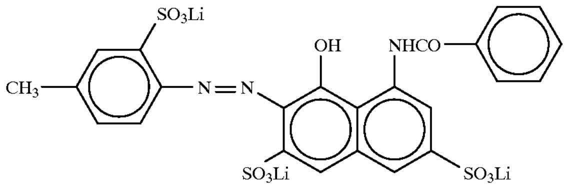

EXAMPLE 1

Using the above respective dyes, four inks of black, cyan, magenta and yellow colors were prepared in the following manner.

| Dye (respective color dyes) | Respective parts |
|---|---|
| Glycerol | 5 parts |
| Urea | 5 parts |
| Thiodiglycol | 6 parts |
| Ethanol | 4 parts |
| Purified water | Balance. |

The above respective compositions were thoroughly stirred and then filtered under pressure through a Fluoropore Filter (trade name, product of Sumitomo Electric Industries, Ltd.) having a pore size of 0.22 μm, thereby preparing the four inks of different colors used in this example.

A colorless ink having the following composition used in the present example was also prepared in the above-described manner.

| | |
|---|---|
| Thiodiglycol | 5 parts |
| Nonionic surfactant (Acetylenol EH, product of Kawaken Fine Chemicals Co., Ltd.) | 5 parts |
| Purified water | Balance. |

EXAMPLE 2

Four inks of black, cyan, magenta and yellow colors were prepared in the same manner as in Example 1, and a colorless ink having the following composition was further prepared, thereby providing five inks used in this example.

| | |
|---|---|
| Thiodiglycol | 5 parts |
| Ionic surfactant (Pelex OT-P, product of Kao Corporation) | 1 part |
| Purified water | Balance. |

EXAMPLE 3

Four inks of black, cyan, magenta and yellow colors were prepared in the same manner as in Example 1, and a colorless ink having the following composition was further prepared, thereby providing five inks used in this example.

| | |
|---|---|
| Thiodiglycol | 5 parts |
| Amphoteric surfactant (AM-301, product of Nikko Chemicals Co., Ltd.) | 3 parts |
| Purified water | Balance. |

COMPARATIVE EXAMPLE 1

Four inks of black, cyan, magenta and yellow colors were prepared in the same manner as in Example 1, and a colorless ink having the following composition was further prepared, thereby providing five inks used in this example.

| | |
|---|---|
| Thiodiglycol | 5 parts |
| Purified water | Balance. |

EVALUATION

The respective sets of the five inks thus obtained were then used to conduct recording on commercially-available paper for copying and bond paper. As an ink-jet recording apparatus, was used a recording apparatus similar to that shown in FIG. 5, and color images were formed using 5 recording heads as illustrated in FIG. 8.

Incidentally, the individual recording heads used herein were the same as that used in an ink-jet printer, BJC-820J (trade name, manufactured by Canon Inc., 360 dpi). The drive conditions of each of the recording heads, i.e., conditions for energizing a heater were as follows:

Voltage applied: 28 V

Pulse length: 3.2 μsec

Drive frequency: 5 kHz.

The evaluation items and methods of the thus-obtained record samples were as follows. The evaluation results are shown in Table 1.

(1) Resistance to bleeding:

Color print samples were prepared in such a manner that different colors adjoined each other to observe whether bleeding occurred or not. In these samples, colors used were seven colors of black, yellow, cyan and magenta, and red, blue and green which were produced by overlapping any two colors of cyan, magenta and yellow to mix them. A boundary region to be applied with the colorless ink was determined to be up to 0.2 mm (about 3 dots) from a boundary line between two colors adjoining each other in the directions of the individual colors. The resistance to bleeding was ranked in accordance with the following standard:

A: No bleeding was recognized at any boundaries;

B: Bleeding was conspicuously recognized at boundaries between red, green and blue colors, to which a greater amount of inks were applied;

C: Conspicuous bleeding was recognized at almost all boundaries.

(2) Color evenness:

Color solid-printed areas were visually observed to rank their color evenness in accordance with the following standard. In particular, whether a difference in color tone arose between a portion applied with the colorless ink and a portion not applied with the colorless ink was observed.

A: No difference in color tone arose;

B: Unevenness of color tone partly took place;

C: Unevenness of color tone took place.

(3) Percent occurrence of feathering:

Three hundred dots were continuously printed on commercially-available paper for copying and bond paper so as not to overlap to one another. After the thus-obtained print sample was air-dried for 24 hours in the interior of a room, the number of dots on which undefined or irregular feathering occurred was counted through a microscope to rank the reference to feathering in terms of percent occurrence of feathering in accordance with the following standard:

A: Not higher than 5%

B: 6 to 20%

C: Not lower than 21%.

(4) Storage stability:

Each of the inks was placed in an amount of 100 ml in a heat-resistant glass bottle and hermetically sealed therein to store it for 2 months in a temperature controlled chamber at 60° C. This ink was then charged in the printer to conduct printing, thereby ranking the storage stability of the ink in accordance with the following standard:

A: Printing could be conducted normally;

B: Ejection failure, printing disorder or discoloration occurred.

(5) Clogging tendency (recovery property from crusting):

After an ink to be tested was charged in the printer to continuously print English characters and numerals for 10 minutes, the printer was stopped and left over for 1 month without capping the head. After conducting recovery operation from clogging of nozzles, English characters and numerals were printed again to determine whether a normal printing state free of blurred and/or defective characters could be reproduced or not, thereby ranking the clogging tendency of the ink in terms of the number of recovery operations required to reproduce the normal printing state in accordance with the following standard:

A: Normal printing state was recovered by conducting recovery operation 1 to 5 times;

B: Normal printing state was recovered by conducting recovery operation 6 to 10 times;

C: Normal printing state was recovered by conducting recovery operation at least 11 times.

TABLE 1

| | Evaluation results | | | | |
|---|---|---|---|---|---|
| Ink | Resistance to bleeding | Color evenness | Percent occurrence of feathering | Storage stability | Clogging tendency |
| Ex. 1 | A | A | A | A | A |
| Ex. 2 | A | A | A | A | A |
| Ex. 3 | A | A | A | A | A |
| Comp. Ex. 1 | C | C | A | A | A |

According to the ink-jet recording method, as described above, high-quality images free of any bleeding can be provided even when conducting printing at high speed on plain paper.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet printing method using at least four water-based inks composed of three color inks of cyan, magenta and yellow colors and a penetrant-containing colorless ink to form a color image containing different colors on a printing material comprising paper, said penetrant being selected from nonionic surfactants and anionic surfactants, comprising the steps of:

providing the at least four inks; and conducting printing by applying at least one of the color inks after the colorless ink has been applied in a first region along boundary lines defined by differences in hue of an image formed with the color inks, and by applying at least one of the color inks alone to form an image in regions other than the first region.

2. The ink-jet printing method according to claim 1, wherein the penetrant comprises at least one surfactant selected from the group consisting of nonionic surfactants, ionic surfactants and amphoteric surfactants.

3. The ink-jet printing method according to claim 1, wherein the penetrant in the colorless ink is present in a range of from 0.5 to 20% by weight of the colorless ink.

4. The ink-jet printing method according to claim 1, wherein the region to which the colorless ink is applied is a part of the region along the boundary lines defined by differences in hue of an image formed with the color ink.

5. The ink-jet printing method according to claim 4, wherein the part of the region along the boundary lines is a region not exceeding 0.3 mm from the boundary lines defined by two or more color inks adjoining each other in directions of the individual colors.

6. The ink-jet printing method according to claim 1, wherein the three inks of cyan, magenta and yellow colors each have a surface tension within a range of from 0.03 to 0.7 N/m.

7. An ink-jet printing process comprising ejecting droplets of an ink from an orifice in accordance with a recording signal to conduct recording on a recording material, wherein the process is carried out in accordance with the recording method according to claim 1.

8. The ink-jet printing process according to claim 7, wherein the ink droplets are ejected by applying thermal energy to the ink.

9. The ink-jet printing method according to claim 1, wherein said printing material is plain paper.

10. The ink-jet printing method according to claim 2, wherein the nonionic surfactant is selected from the group comprising ethylene oxide adducts of alkylphenylethers, polyethylene oxide-polypropylene oxide copolymers and ethylene oxide adducts of acetylene glycol.

* * * * *

UNITED STATES PATENT AND TRADEMARK OFFICE
CERTIFICATE OF CORRECTION

PATENT NO. : 5,933,164

DATED : August 3, 1999

INVENTOR(S) : SHINICHI SATO, ET AL. Page 1 of 2

It is certified that error appears in the above-identified patent and that said Letters Patent is hereby corrected as shown below:

ON THE COVER PAGE:

Item [57] ABSTRACT

Line 6, "each other" should read --with each other--.

IN THE DISCLOSURE:

COLUMN 1:

Line 16, "softwear" should read --software--.

COLUMN 2:

Line 29, "each other" should read --with each other--.

COLUMN 3:

Line 5, "each other" should read --with each other--.
Line 23, "surfactant," should read --surfactants and--.

UNITED STATES PATENT AND TRADEMARK OFFICE

CERTIFICATE OF CORRECTION

PATENT NO. : 5,933,164

DATED : August 3, 1999

INVENTOR(S) : SHINICHI SATO, ET AL.

It is certified that error appears in the above-identified patent and that said Letters Patent is hereby corrected as shown below:

COLUMN 4:

Line 21, "respective namely," should read --respective dots, namely, those--.

COLUMN 6:

Line 26, "off" should be deleted.

COLUMN 10:

Line 38, "that" should read --those--.

Signed and Sealed this

Eleventh Day of July, 2000

Attest:

Q. TODD DICKINSON

Attesting Officer

*Director of Patents and Trademarks*